(12) United States Patent
Tazawa et al.

(10) Patent No.: US 9,024,552 B2
(45) Date of Patent: May 5, 2015

(54) CURRENT CONTROL GAIN ADJUSTING METHOD FOR PM MOTOR, CURRENT CONTROL METHOD, AND CONTROL DEVICE

(75) Inventors: Toru Tazawa, Osaka (JP); Masaru Nishizono, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 105 days.

(21) Appl. No.: 13/825,194

(22) PCT Filed: Sep. 28, 2011

(86) PCT No.: PCT/JP2011/005446
§ 371 (c)(1),
(2), (4) Date: Mar. 20, 2013

(87) PCT Pub. No.: WO2012/046410
PCT Pub. Date: Apr. 12, 2012

(65) Prior Publication Data
US 2013/0175970 A1   Jul. 11, 2013

(30) Foreign Application Priority Data
Oct. 8, 2010   (JP) .................................. 2010-228290

(51) Int. Cl.
*H02P 6/00*       (2006.01)
*H02P 21/05*      (2006.01)
*H02P 21/00*      (2006.01)
*H02P 21/14*      (2006.01)

(52) U.S. Cl.
CPC ............ *H02P 21/05* (2013.01); *H02P 21/0003* (2013.01); *H02P 21/0035* (2013.01); *H02P 21/145* (2013.01) 318/630

(58) Field of Classification Search
USPC ........ 318/400.01, 400.03, 561, 630, 632, 254
See application file for complete search history.

(56) References Cited

U.S. PATENT DOCUMENTS

| 4,956,593 | A | * | 9/1990 | Sakamoto et al. ............ 318/561 |
| 5,936,378 | A | * | 8/1999 | Iijima et al. ................... 318/807 |
| 6,891,737 | B1 | * | 5/2005 | Matsubara et al. ............ 363/95 |
| 6,998,811 | B2 | * | 2/2006 | Myers et al. .................. 318/632 |

(Continued)

FOREIGN PATENT DOCUMENTS

| JP | 06-273496 A | 9/1994 |
| JP | 07-055899 A | 3/1995 |

(Continued)

OTHER PUBLICATIONS

International Search Report for International Application No. PCT/JP2011/005446, dated Dec. 27, 2011, 2 pages.

*Primary Examiner* — Paul Ip
(74) *Attorney, Agent, or Firm* — Brinks Gilson & Lione (57) ABSTRACT

The present invention includes a voltage applying step of applying an applied voltage including a DC component and a plurality of frequency components to a PM motor, a motor current detecting step of detecting a motor current flowing depending on the applied voltage, and a current control gain adjusting step of calculating a current control gain based on frequency characteristics of the applied voltage and the motor current. In this manner, a stable current control gain having a high current response can be adjusted within a short period of time.

6 Claims, 10 Drawing Sheets

(56) References Cited

U.S. PATENT DOCUMENTS

| | | | |
|---|---|---|---|
| 7,088,063 B2* | 8/2006 | Kurosawa et al. | 318/400.35 |
| 7,893,650 B2* | 2/2011 | Arnet | 318/811 |
| 7,956,568 B2* | 6/2011 | Iwashita et al. | 318/632 |
| 8,521,396 B2* | 8/2013 | Kobashi et al. | 701/99 |
| 2004/0155620 A1* | 8/2004 | Myers et al. | 318/632 |
| 2005/0067986 A1* | 3/2005 | Kurosawa et al. | 318/254 |
| 2006/0012323 A1* | 1/2006 | Endo et al. | 318/432 |
| 2006/0158142 A1* | 7/2006 | Kurosawa et al. | 318/254 |
| 2008/0024086 A1* | 1/2008 | Fukunishi | 318/619 |
| 2008/0079378 A1 | 4/2008 | Nakatsugawa et al. | |
| 2009/0174357 A1* | 7/2009 | Iwashita et al. | 318/629 |
| 2009/0189553 A1* | 7/2009 | Arnet | 318/400.3 |
| 2012/0173043 A1* | 7/2012 | Kobashi et al. | 701/1 |
| 2013/0147453 A1* | 6/2013 | Hirotsu et al. | 323/282 |
| 2013/0249447 A1* | 9/2013 | Ishii et al. | 318/400.01 |
| 2014/0145696 A1* | 5/2014 | Hoshino et al. | 323/283 |

FOREIGN PATENT DOCUMENTS

| | | |
|---|---|---|
| JP | 09-084378 A | 3/1997 |
| JP | 2000-050700 A | 2/2000 |
| JP | 2000-312498 A | 11/2000 |
| JP | 2003-070280 A | 3/2003 |
| JP | 2008-086129 A | 4/2008 |
| JP | 2009-183062 A | 8/2009 |

\* cited by examiner

CURRENT CONTROL GAIN ADJUSTING METHOD FOR PM MOTOR, CURRENT CONTROL METHOD, AND CONTROL DEVICE

This application is a 371 application of PCT/JP2011/005446 having an international filing date of Sep. 28, 2011, which claims priority to JP2010-228290 filed Oct. 8, 2010, the entire contents of which are incorporated herein by reference.

TECHNICAL FIELD

The present invention relates to a current control gain adjusting method for a PM motor, a current control method, and a control device having a current control system that detects and controls a motor current.

BACKGROUND ART

In recent years, a control device for a PM motor that performs speed control by vector control has been developed.

A conventional control device for a PM motor that performs speed control by vector control will be described below with reference to FIG. 10.

Figure 10:
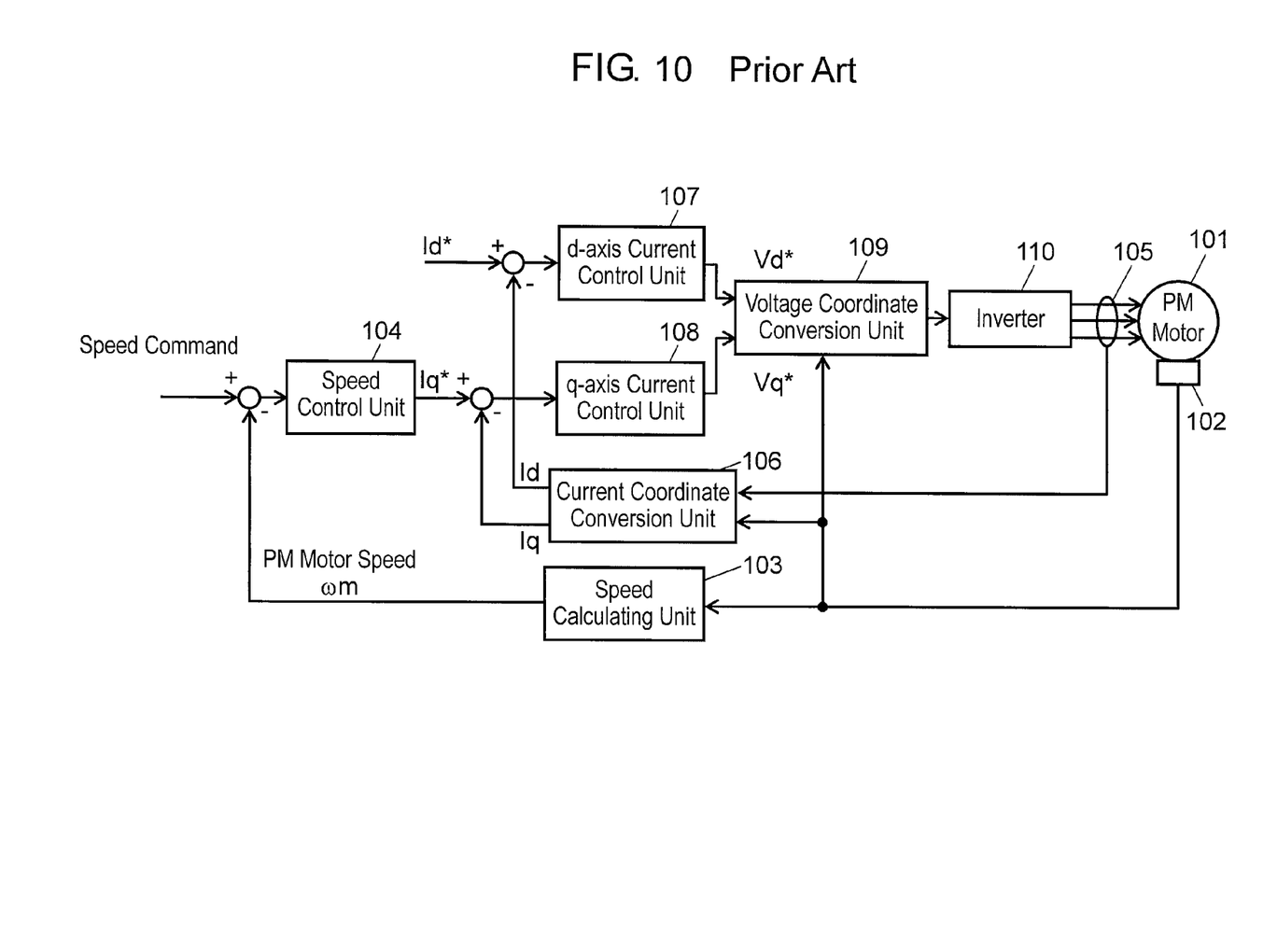
FIG. 10 is a block diagram showing a configuration of a conventional motor control device for a PM motor.

FIG. 10 is a block diagram showing a configuration of a conventional motor control device for a PM motor.

As shown in FIG. 10, the motor control device for a PM motor includes at least PM motor 101, speed calculating unit 103, speed control unit 104, current detector 105, current coordinate conversion unit 106, d-axis current control unit 107, q-axis current control unit 108, voltage coordinate conversion unit 109, and inverter 110.

The motor control device for a PM motor shown in FIG. 10 drives PM motor 101 by the operation described below.

More specifically, position detector 102 is attached to PM motor 101 to detect a rotational position of PM motor 101. Speed calculating unit 103 calculates speed ωm of PM motor 101 based on position information detected by position detector 102. Speed control unit 104 calculates q-axis current command Iq* by using a deviation between speed ωm and speed command ω* as an input such that speed ωm of PM motor 101 calculated by speed calculating unit 103 follows given speed command ω*. At this time, speed control unit 104 is operated by, for example, proportional-integral control.

Current coordinate conversion unit 106 performs coordinate conversion to a detection value of a motor current detected by current detector 105 to calculate and output d-axis current Id serving as a component having the same direction as that of an axis of magnetic poles of PM motor 101 and q-axis current Iq serving as a component having a direction perpendicular to the d-axis. Then, d-axis current control unit 107 calculates and outputs d-axis voltage command Vd* such that d-axis current Id follows d-axis current command Id* given in advance. Moreover, q-axis current control unit 108 calculates and outputs q-axis voltage command Vq* such that q-axis current Iq follows q-axis current command Iq*. At this time, d-axis current control unit 107 and q-axis current control unit 108 are operated by, for example, proportional-integral control.

Voltage coordinate conversion unit 109 forms a three-phase voltage command from d-axis voltage command Vd* and q-axis voltage command Vq*. Inverter 110 drives PM motor 101 based on the voltage command formed by voltage coordinate conversion unit 109.

At this time, in order to stably drive the PM motor by a conventional drive device for a PM motor, current control gains of d-axis current control unit 107 and q-axis current control unit 108 need to be properly set to realize stable current control. In order to obtain high speed-controllability of the PM motor, a current control gain of a current control system serving as a minor loop of a speed control system is desired to be high as much as possible.

Thus, in the conventional control device for a PM motor, some techniques that adjust current control gains are disclosed (for example, refer to PTL 1). The technique disclosed in PTL 1 targets an induction motor and uniquely determines a current control gain based on an arithmetic expression by using a resistance, an inductance, and a control delay time serving as a circuit constant (motor constant) of an equivalent circuit including a load.

Another technique that calculates motor constants such as a resistance and an inductance is disclosed in, for example, PTL 2. According to PTL 2, a resistance is calculated based on an input voltage and an input current obtained when a DC current is caused to flow in PM motor 101. Fundamental wave components of an input voltage and an input current obtained when an AC current is caused to flow in PM motor 101 are extracted, and an inductance is calculated based on the magnitudes of the input voltage and the input current and a phase difference between the input voltage and the input current. A current control gain is calculated based on the calculated resistance and the calculated inductance.

However, in PTL 1, a resistance and an inductance serving as equivalent circuit constants need to be examined in advance. Since a cut-off frequency that determines a response of current control is calculated by a fixed expression, a current response may not be always maximized.

On the other hand, in PTL 2, measurement of a motor constant that is a problem in PTL 1 is possible. However, in order to calculate a wire wound resistor, a time until a DC current caused to flow in PM motor 101 is set in a steady state is required. Since the resistance and the inductance are measured by using different test signals, respectively, long times are disadvantageously required for the measurement.

PTL 1: Unexamined Japanese Patent Publication No. 9-84378

PTL 2: Unexamined Japanese Patent Publication No. 2000-312498

SUMMARY OF THE INVENTION

A current control gain adjusting method for a PM motor according to the present invention includes a step of applying an applied voltage having a DC component and a plurality of frequency components to a PM motor, a step of detecting a motor current flowing depending on the applied voltage, and a step of calculating a stable current control gain having a high current response by using a frequency characteristic serving as a relationship between the applied voltage and the motor current.

In this manner, a stable current control gain having a high current response can be adjusted within a short period of time.

DETAILED DESCRIPTION OF THE PREFERRED EMBODIMENTS

Exemplary embodiments of the present invention will be described below with reference to the drawings. The present invention is not limited to the exemplary embodiments.

First Exemplary Embodiment

A current control gain adjusting method and a motor control device for a PM motor in a first exemplary embodiment of the present invention will be described below with reference to FIG. 1.

Figure 1:
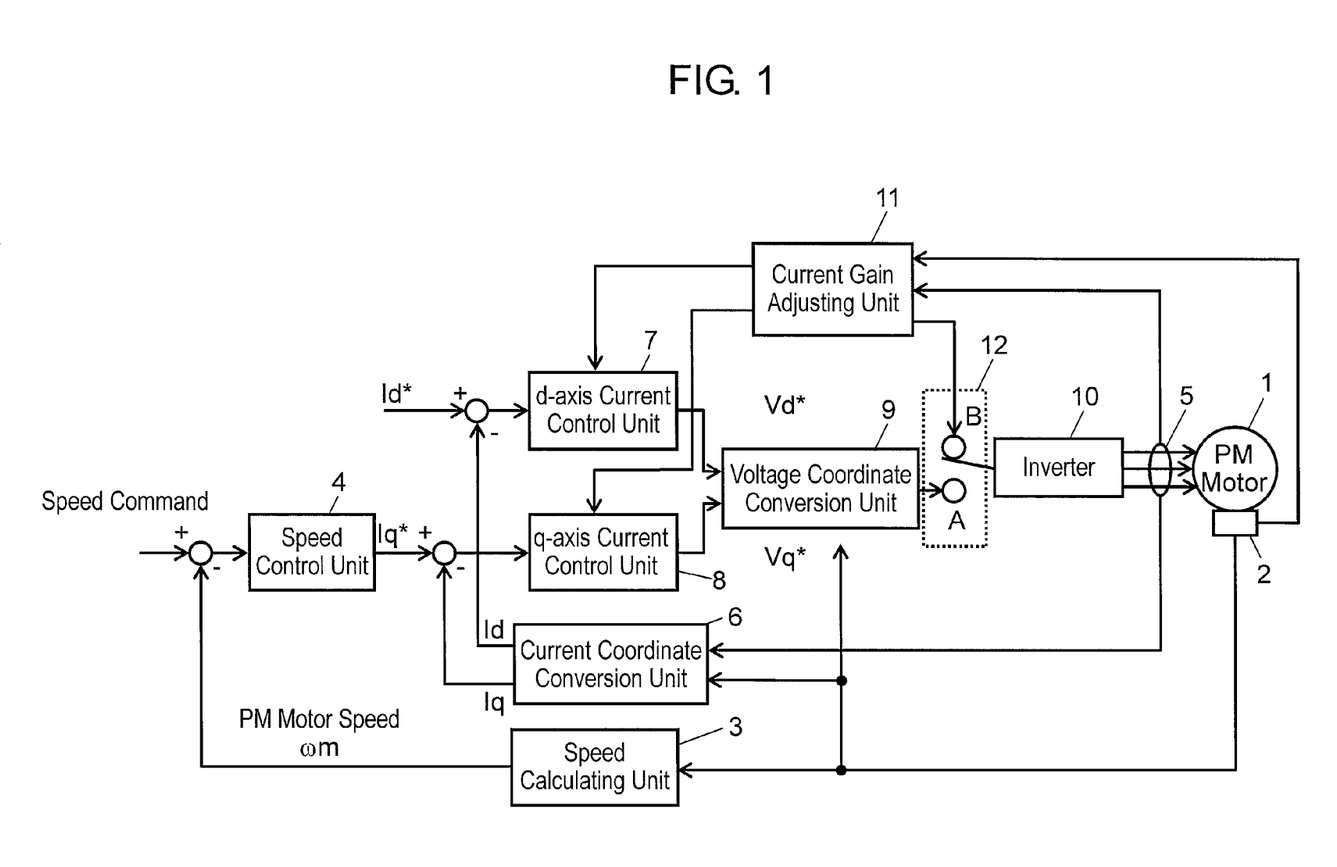
FIG. 1 is a block diagram showing a configuration of a motor control device for a PM motor in a first exemplary embodiment of the present invention.

FIG. 1 is a block diagram showing a configuration of a motor control device for a PM motor in the first exemplary embodiment of the present invention.

As shown in FIG. 1, the motor control device for a PM motor according to the exemplary embodiment includes at least PM motor 1, speed calculating unit 3, speed control unit 4, current detector 5, current coordinate conversion unit 6, d-axis current control unit 7, q-axis current control unit 8, voltage coordinate conversion unit 9, inverter 10, current gain adjusting unit 11, and voltage command switching unit 12.

More specifically, the motor control device for a PM motor shown in FIG. 1 drives PM motor 1 by the following operations.

More specifically, position detector 2 is attached to PM motor 1 to detect a rotational position of PM motor 1. Speed calculating unit 3 calculates PM motor speed ωm based on rotational position information of PM motor 1 detected by position detector 2. Speed control unit 4 calculates and outputs q-axis current command Iq* by performing control such that motor speed ωm calculated by speed calculating unit 3 follows speed command ω*. Current detector 5 detects a motor current flowing in PM motor 1. Current coordinate conversion unit 6 converts the motor current detected by current detector 5 into d-axis current Id and q-axis current Iq to output the currents. d-axis current control unit 7 calculates and outputs d-axis voltage command Vd* by performing control such that d-axis current Id converted by current coordinate conversion unit 6 follows d-axis current command Id*. q-axis current control unit 8 calculates and outputs q-axis voltage command Vq* by performing control such that q-axis current Iq converted by current coordinate conversion unit 6 follows q-axis current command Iq*. Voltage coordinate conversion unit 9 converts d-axis voltage command Vd* and q-axis voltage command Vq* into three-phase voltage commands. Inverter 10 applies a voltage depending on the input three-phase voltage commands to PM motor 1. Current gain adjusting unit 11 performs an adjusting process of a current control gain to set the current control gain in d-axis current control unit 7 and q-axis current control unit 8.

Voltage command switching unit 12 switches between an output from voltage coordinate conversion unit 9 and an output from current gain adjusting unit 11 as a three-phase voltage command input to inverter 10. Usually, in speed control of PM motor 1, voltage command switching unit 12 is switched to an A side shown in FIG. 1. In current control gain adjustment, voltage command switching unit 12 is switched to a B side in FIG. 1.

A current control gain adjusting method for PM motor 1 will be concretely described below.

Voltage command switching unit 12 of the motor drive apparatus for PM motor 1 is switched to the B side. Current gain adjusting unit 11 adjusts a current control gain of an output from inverter 10 applied to PM motor 1.

Operations and actions of current gain adjusting unit 11 will be concretely described below with reference to FIG. 2 to FIG. 4B in addition to FIG. 1.

Figure 2:
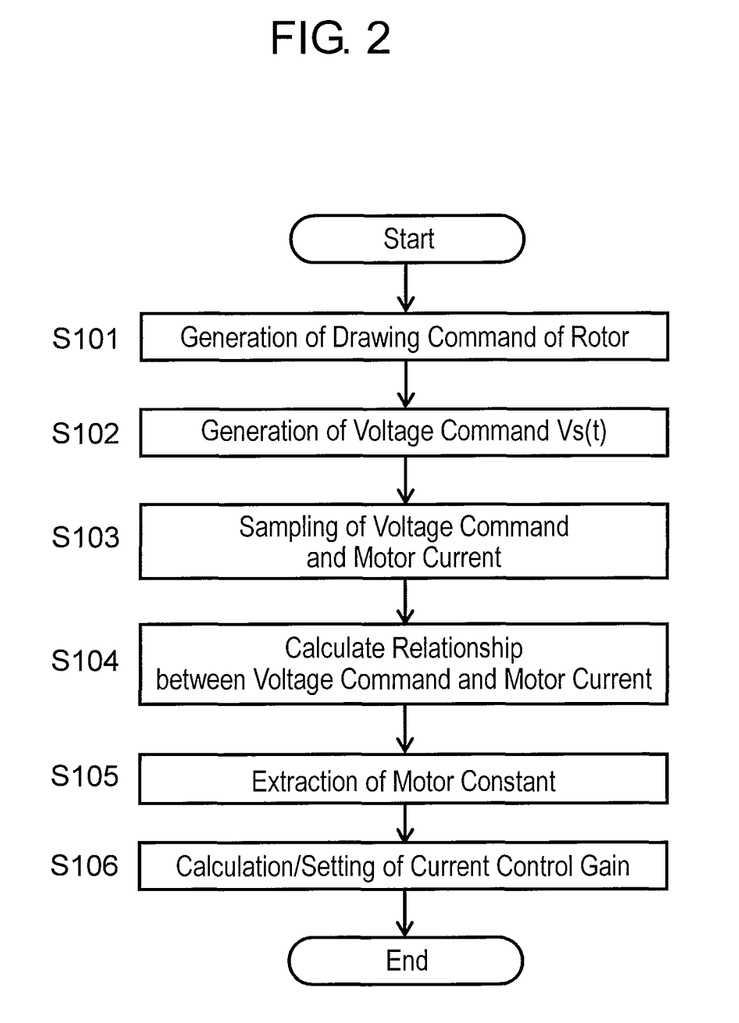
FIG. 2 is a flow chart showing a flow of a process of adjusting a current control gain of a current gain adjusting unit in the first exemplary embodiment of the present invention.
Figure 3:
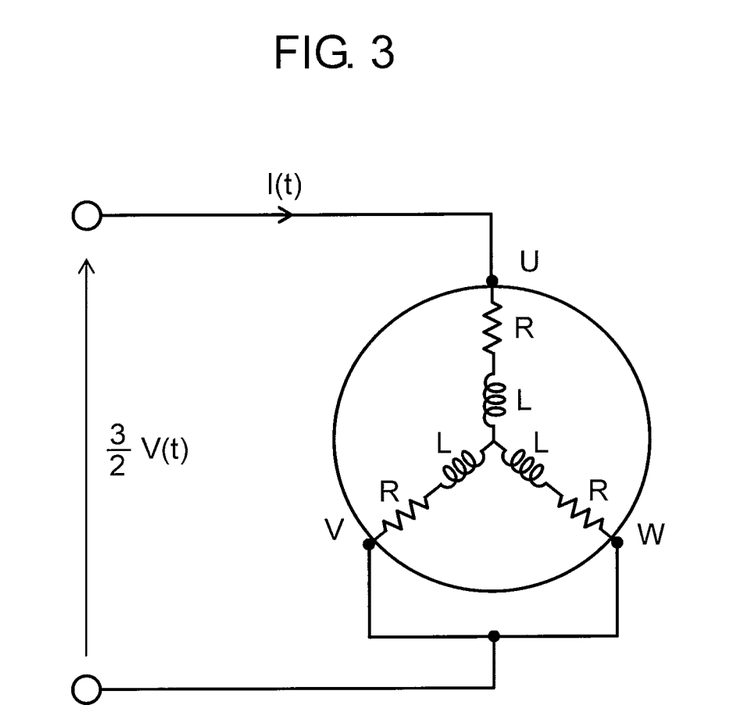
FIG. 3 is an equivalent circuit diagram for explaining a single-phase energization state of a PM motor.
Figure 4A:
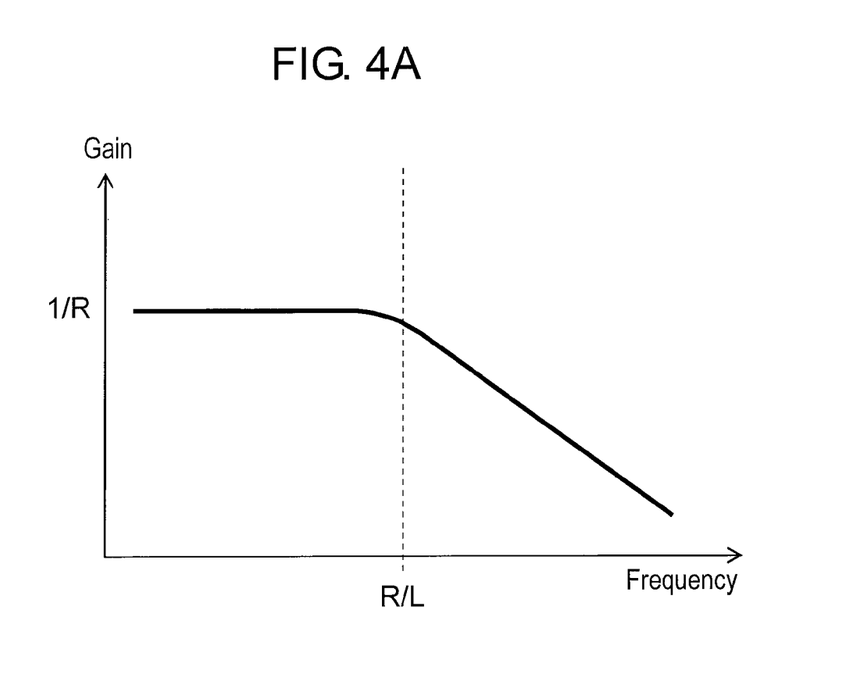
FIG. 4A is a graph showing a frequency characteristic of a transfer function (gain) of the PM motor.
Figure 4B:
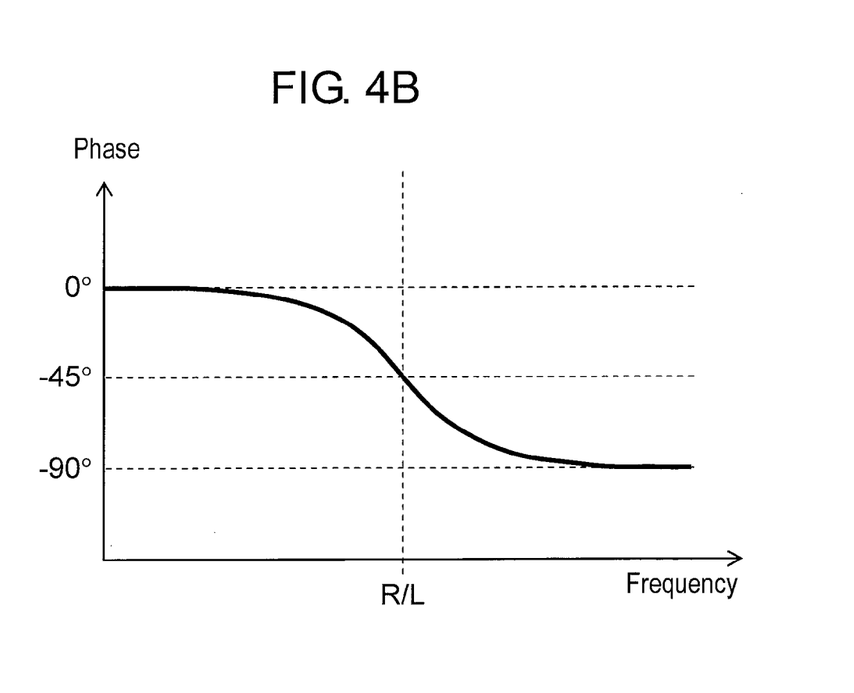
FIG. 4B is a graph showing a frequency characteristic of a transfer function (phase) of the PM motor.

FIG. 2 is a flow chart showing a flow of a process of adjusting a current control gain of a current gain adjusting unit in the first exemplary embodiment of the present invention. FIG. 3 is an equivalent circuit diagram for explaining a single-phase energization state of a PM motor. FIG. 4A is a graph showing a frequency characteristic of a transfer function (gain) of the PM motor. FIG. 4B is a graph showing a frequency characteristic of a transfer function (phase) of the PM motor.

As shown in FIG. 2, when an adjusting process of a current control gain is started, a drawing voltage command is generated and output to draw a rotor of PM motor 1 to a predetermined position (step S101). This is because, since the rotor in PM motor 1 may be rotated by applying the voltage due to a magnet being present on the rotor, the rotor of PM motor 1 is fixed to a predetermined position in advance. For this reason, calculation of a motor constant is preferably performed in a state in which the rotor of PM motor 1 stands still. Thus, based on a drawing voltage command of PM motor 1, DC voltage Va and DC voltages −Va/2 are applied to, for example, a U phase, a V phase, and a W phase, respectively, to draw the rotor of PM motor 1 to a predetermined position. DC voltage Va is set as a voltage obtained when a current almost equal to the rated current of PM motor 1 flows in, for example, application of a voltage such that the rotor of PM motor 1 is sufficiently drawn to the predetermined position.

At this time, an equivalent circuit of PM motor 1 obtained after the rotor of PM motor 1 is drawn to the predetermined position is shown in FIG. 3. More specifically, as shown in FIG. 3, since the rotor of PM motor 1 does not rotate, the equivalent circuit of PM motor 1 includes phase resistance R and phase inductance L to apply a single-phase applied voltage across U-VW phases. In this manner, a current axis (d-axis) and an axis of magnetic poles are matched with each other.

Voltage command Vs(t) serving as an applied voltage applied to calculate a motor constant is generated (step S102). More specifically, as shown in Equation 1, voltage command Vs(t) obtained by adding Vn(t) having a plurality of frequency components to DC component V0 is generated. At this time, as voltage command Vn(t), for example, an M-sequence signal (Maximum Length Sequence Signal) is used.

The reason why voltage command Vs(t) obtained by adding voltages V0 and Vn is generated will be described later.

$$Vs(t)=V0+Vn(t) \quad \text{(Equation 1)}$$

Based on generated voltage command Vs(t), voltage command Vs(t) is output to inverter 10, for example, a voltage Vs(t) is applied to the U phase and a voltage −Vs(t)/2 is applied to the V phase and the W phase to apply a single-phase applied voltage across the U-VW phases as in the drawing state. At this time, since a motor current flowing in PM motor 1 due to voltage command Vs(t) flows along the d-axis matched with the axis of magnetic poles, a torque that rotates the rotor of PM motor 1 is not generated. In this manner, in a state in which the rotor of PM motor 1 is stopped, data measurement to calculate a motor constant can be performed.

Voltage command Vs(t) applied in step S102 and motor current Is(t) serving as a response of voltage command Vs(t) are sampled and taken into as time-series data (step S103). In this case, since motor current Is(t) serves as a motor current to the single-phase applied voltage applied across the U-VW phases, a U-phase motor current is sampled.

By using a relationship between voltage command Vs(t) and motor current Is(t), a frequency characteristic of transfer function H(s) from voltage command Vs(t) to motor current Is(t) is calculated (step S104). The frequency characteristic of transfer function H(s) can be obtained by performing an FFT (Fast Fourier Transform) process or the like to voltage command Vs(t) and motor current Is(t).

Electric time constant L/R serving as a motor constant of a PM motor and phase resistance R are extracted from a frequency characteristic of transfer function H(s). At this time, an equivalent circuit of the PM motor when voltage command Vs(t) is applied is as shown in FIG. 3, and a transfer function H(s) is expressed by Equation 2.

$$\frac{Is}{Vs} = \frac{(1/R)}{(L/R)s+1} \cdot Hdelay(s) \quad \text{(Equation 2)}$$

Hdelay(s) in Equation 2 is a time delay element of a current control system.

In this case, a frequency characteristic of a part obtained by removing the time delay element from transfer function H(s) shown by Equation 2 will be described with reference to FIG. 4A and FIG. 4B.

FIG. 4A is a graph showing a frequency characteristic of a transfer function (gain) of the PM motor. FIG. 4B is a graph showing a frequency characteristic of a transfer function (phase) of the PM motor.

As shown in FIG. 4A and FIG. 4B, relationships between a gain, a phase, and a frequency serving as the frequency characteristics of the transfer function of the PM motor are examined to make it possible to calculate cut-off frequency R/L and DC (Direct Current) gain 1/R.

Inverse numbers of cut-off frequency R/L and DC gain 1/R are calculated to obtain an electric time constant L/R and phase resistance R serving as a motor constant of the PM motor (step S105). The electric time constant obtained as described above is an electric time constant on the d-axis.

Based on electric time constant L/R and phase resistance R serving as a motor constant of the PM motor obtained in step S105, a current control gain is calculated and set.

At this time, control in d-axis current control unit 7 is proportional-integral control. For example, when a proportional gain and an integral gain are given by Kdp and Kdi, respectively, transfer function Hcd(s) of d-axis current control unit 7 is given by Equation 3.

$$Hcd(s) = Kdp + \frac{Kdi}{s} \quad \text{(Equation 3)}$$

In this case, when proportional gain Kdp and integral gain Kdi are defined as in Equation 4, $$Kdp = K\alpha \cdot R \quad \text{(Equation 4)}$$

$$Kdi = Kdp \cdot (L/R)$$

Open transfer function Hopd(s) of the d-axis current control system is given by Equation 5.

$$\begin{aligned} Hopd(s) &= Hcd(s) \cdot \frac{Is}{Vs} \\ &= \left[K\alpha \cdot R + \frac{K\alpha \cdot L}{s}\right] \cdot \frac{(1/R)}{(L/R)s+1} \cdot Hdelay(s) \\ &= \frac{K\alpha}{s} \cdot Hdelay(s) \end{aligned} \quad \text{(Equation 5)}$$

$$Hopd(s) = Hcd(s) \cdot \frac{Is}{Vs}$$

In this case, a frequency characteristic of the open transfer function Hopd(s) of the d-axis current control system shown in Equation 5 will be described with reference to FIG. 5A and FIG. 5B.

Figure 5A:
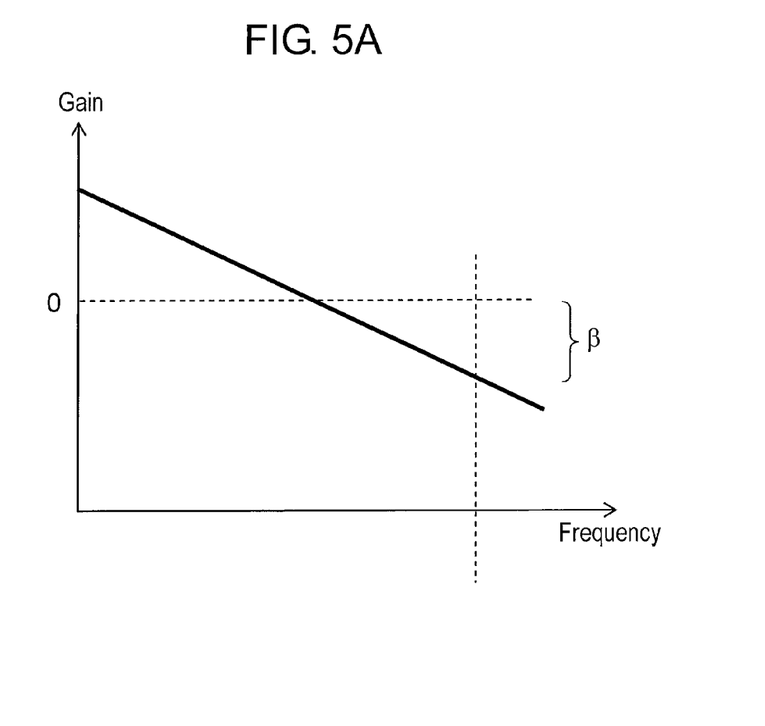
FIG. 5A is a graph showing a current control open-loop frequency characteristic.

FIG. 5A is a graph showing a frequency characteristic of a current control open-loop. FIG. 5B is a graph showing a frequency characteristic of a current control open-loop.

Figure 5B:
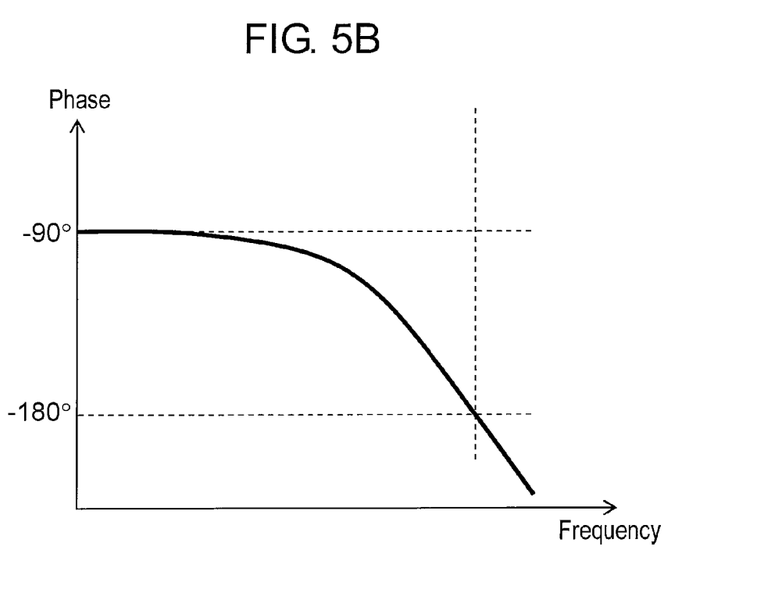
FIG. 5B is a graph showing a current control open-loop frequency characteristic.

As shown in FIGS. 5A and 5B, in order to obtain a stable current control system having a maximum current response, Kα in Equation 5 is calculated such that a gain margin at a frequency at which a phase of open transfer function Hopd(s) of the current control system is −180 degrees is preset value β.

Obtained Kα is substituted to Equation 4 to calculate a current control gain. The current control gain is set in d-axis current control unit 7 and q-axis current control unit 8. At this time, in a PM motor in a d-axis electric time constant equal to a q-axis electric time constant, the current control gain of q-axis current control unit 8 is set to be equal to the current control gain of d-axis current control unit 7.

As described above, according to the exemplary embodiment, applied voltages including a DC component and a plurality of frequency components are applied to the PM motor to detect a motor current flowing depending on the applied voltages, so that a motor constant of the PM motor is calculated by using a relationship between the applied voltages and the detected motor current. More specifically, a motor constant can be calculated only by applying the applied voltages including a DC component and a plurality of frequency components to detect a motor current. In this manner, a wait time until the motor current is in a steady state is not necessary, and a motor constant need not be calculated by applying a plurality of test signals. For this reason, a considerable time crunch can be realized.

According to the exemplary embodiment, by using a frequency characteristic serving as a relationship between a voltage command and a motor current, a current control gain is theoretically calculated. As a result, the current control gain can be adjusted to have a stable and high current response. At this time, in particular, since the frequency characteristic includes a time delay element in the current control system of the motor control device for a PM motor, the current control gain can be adjusted to have a stable and high current response in consideration of a fluctuation of time delay element caused by the motor control device. The high current response means that the current control gain reaches a set current command within a short period of time.

Second Exemplary Embodiment

A current control gain adjusting method and a motor control device for a PM motor in a second exemplary embodiment of the present invention will be described below with reference to the drawings.

The exemplary embodiment is different from the first exemplary embodiment in that the applied voltages including a plurality of different DC components are applied to a PM motor to calculate and set a current control gain. Since the other configurations and operations are the same as those in the first exemplary embodiment, a description thereof will be omitted.

The reason why the applied voltages including a plurality of different DC components are applied to calculate a current control gain will be described below.

In general, depending on the types of motors, an electric time constant serving as a motor constant changes by an influence such as magnetic saturation or the magnitude of a motor current. However, in the method of calculating a current control gain in the first exemplary embodiment, only one current control gain is calculated. For this reason, when the electric time constants of the motor change for the above reason, the motor may not be controlled by a stable current control gain.

Operations and actions of current gain adjusting unit 11 according to the exemplary embodiment will be concretely described below with reference to FIG. 6 and FIG. 7 in addition to FIG. 1.

Figure 6:
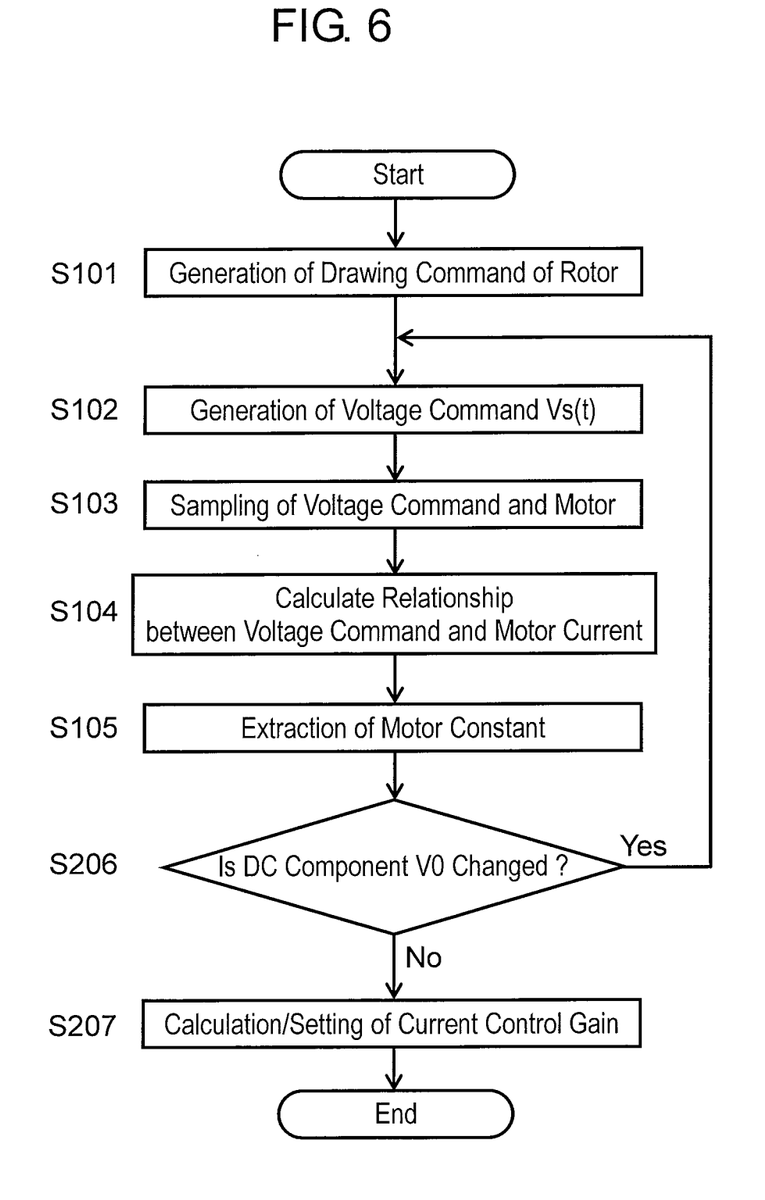
FIG. 6 is a flow chart showing a flow of a process of adjusting a current control gain of a current gain adjusting unit in a second exemplary embodiment of the present invention.

FIG. 6 is a flow chart showing a flow of a process of adjusting a current control gain of a current gain adjusting unit in the second exemplary embodiment of the present invention. FIG. 7 is a graph showing a relationship between a motor current and an electric time constant in the exemplary embodiment. Since, in step S101 to step S105 in FIG. 6, the same processes as in the first exemplary embodiment described with reference to FIG. 2 are performed, a description thereof will be omitted.

More specifically, since in FIG. 6, processes in step S206 and step S207 are added to the steps in FIG. 2, details of the added steps will be described.

As shown in FIG. 6, after the processes from step S101 to step S105 are executed, it is determined whether all the applied voltages having a plurality of DC components V0 are set in generation of a voltage command in step S102 (step S206). In this case, the applied voltages having the plurality of DC components V0 are set in the range of zero to a voltage value obtained when the maximum current defined as a specification of PM motor 1 flows in advance.

At this time, when the applied voltages having the plurality of DC components V0 include an unset value (applied voltage) (Yes in step S206), one unset value (applied voltage) of the applied voltages having the plurality of DC components V0 is selected, and the operation returns to step S102. The processes from step S102 to step S105 are sequentially repeatedly executed to extract a motor constant of the PM motor to each applied voltage of the plurality of DC components.

On the other hand, when all the values of the applied voltages having the plurality of DC components V0 are executed (No in step S206), the operation returns to step S207.

Figure 7:
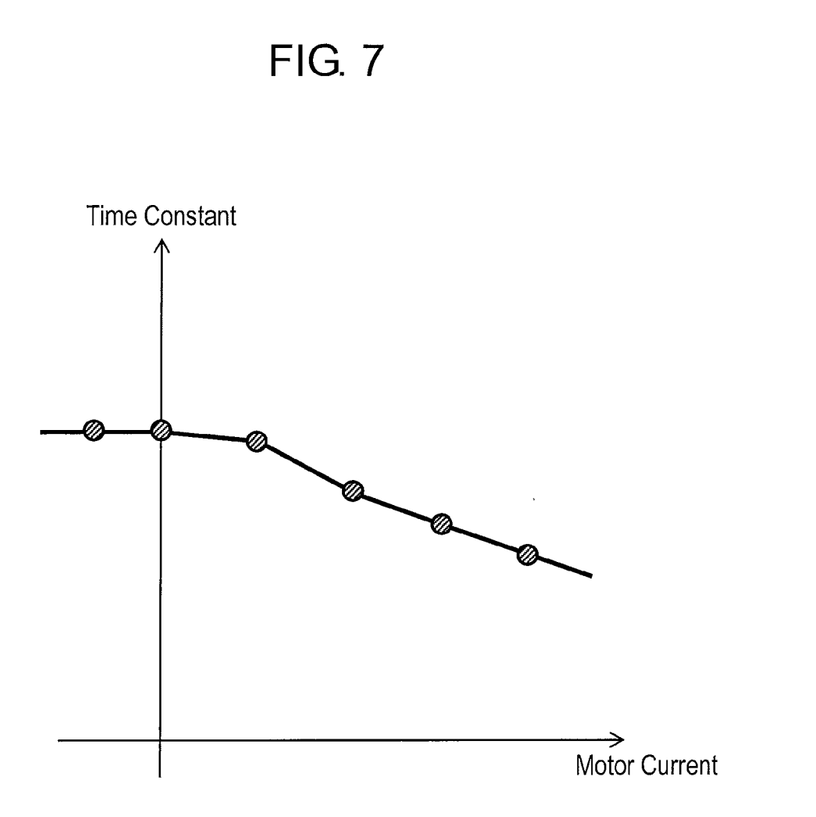
FIG. 7 is a graph showing a relationship between a motor current and an electric time constant in the exemplary embodiment.

More specifically, the processes from step S102 to step S206 are repeated to set a plurality of DC components V0, so that a plurality of relationships between an average value of motor currents corresponding to the applied voltages having DC components as shown in FIG. 7 and the calculated electric time constants are obtained.

Based on the relationships shown in FIG. 7, a plurality of electric time constants corresponding to motor currents of the PM motor are obtained.

With respect to combinations between the plurality of motor constants of PM motor obtained in step S105 and the plurality of frequency characteristics obtained in step S104, Kα having a stable and high current response is calculated, and a proportional gain and an integral gain of the current control unit are calculated. At this time, due to an influence of magnetic saturation or the like, electric time constants change depending on the magnitudes of motor currents. Thus, in order to avoid a gain of the current control unit from being excessively high and unstable, a minimum one of a plurality of combinations of proportional gains and integral gains of the current control unit obtained by repeating the processes from step S102 to step S206 is selected. As a result, the selected combination of the minimum proportional gain and the minimum integral gain is a gain having the maximum current response under the condition in which the PM motor is stably driven. The obtained proportional gain and the obtained integral gain of the obtained current control unit are set (step S207).

As described above, according to the exemplary embodiment, the applied voltages including a plurality of DC components and a plurality of frequency components are applied to the PM motor to detect a plurality of motor currents flowing depending on the plurality of applied voltages, so that electric time constant of the PM motor is calculated by using relationships between the plurality of applied voltages and the detected motor currents.

In this manner, the electric time constants depending on the changing motor currents can be calculated. As a result, in consideration of even a change in electric time constant caused by a change in motor current, a current control gain can be adjusted with a stable and high current response.

Third Exemplary Embodiment

Figure 8:
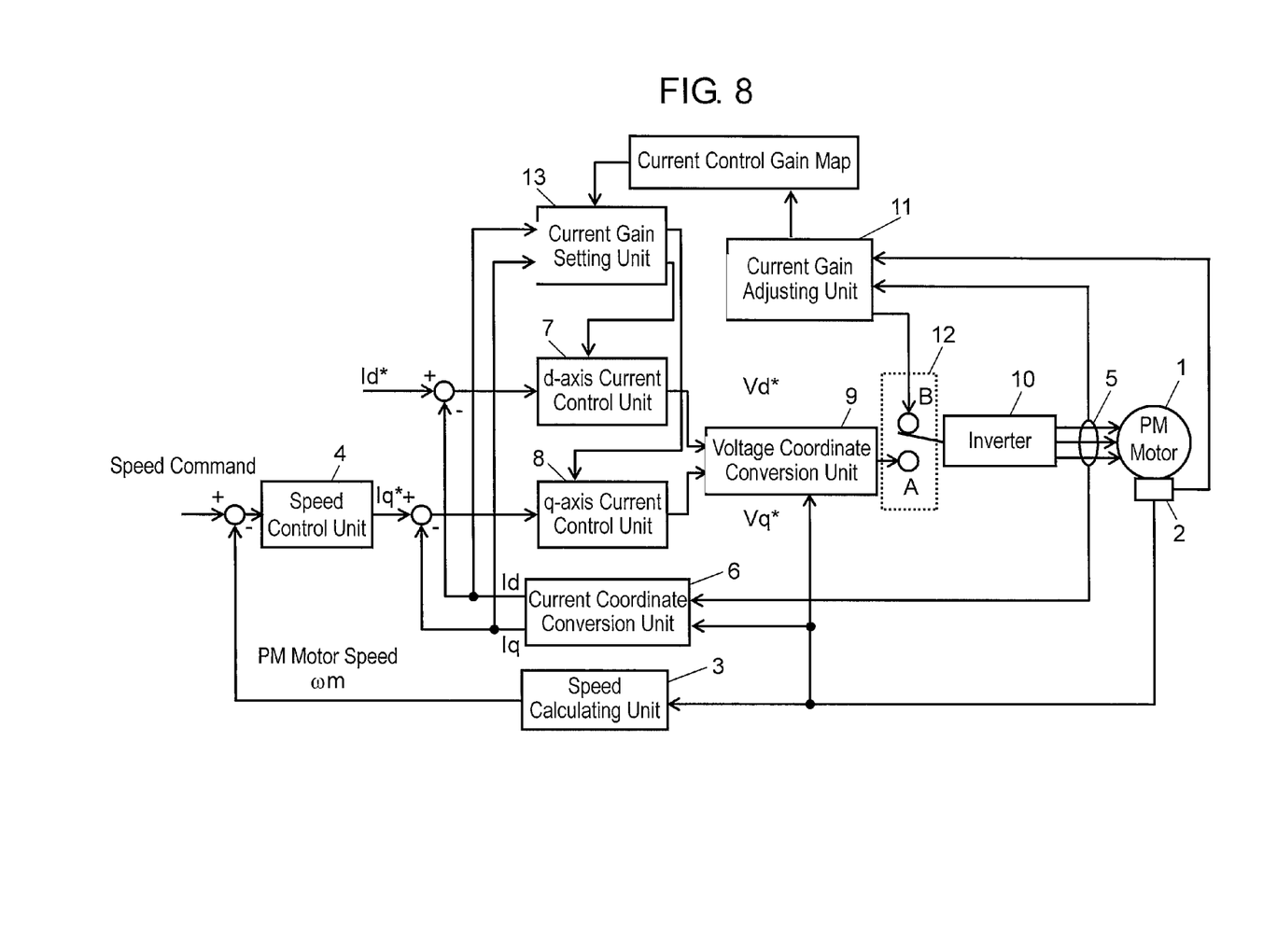
FIG. 8 is a block diagram showing a configuration of a motor control device for a PM motor in a third exemplary embodiment of the present invention.

A current control gain adjusting method, a current control method and a motor control device for a PM motor in a third exemplary embodiment of the present invention will be described below with reference to FIG. 8. The same numbers denote the same configurations and operations in FIG. 8 as those in FIG. 1, and a description thereof will be omitted. In FIG. 8, current gain setting unit 13 is added to the configuration in FIG. 1.

The exemplary embodiment is different from the second exemplary embodiment, in which a current control gain is calculated and set as a fixed value, in that current control gains are changed depending on a change in electric time constant caused by a change in motor current of PM motor to control the motor current.

More specifically, in the exemplary embodiment, the applied voltages including a plurality of different DC components are applied to a PM motor, and, depending on the plurality of applied voltages, an electric time constant depending on a motor current flowing in the PM motor is extracted. Based on the extracted electric time constant, a stable current control gain having a high current response is calculated.

Based on the plurality of current gains calculated depending on motor currents, a current control gain map is formed in association with an average value of the motor currents and stored in, for example, a semiconductor memory or the like. In a normal speed control state of the PM motor, a current control gain depending on a motor current is read from the stored current control gain map, current gain setting unit 13 is set, and the motor current of the PM motor is controlled.

Operations and actions of current gain adjusting unit 11 and current gain setting unit 13 according to the exemplary embodiment will be concretely described below with reference to FIG. 8 and FIG. 9.

Figure 9:
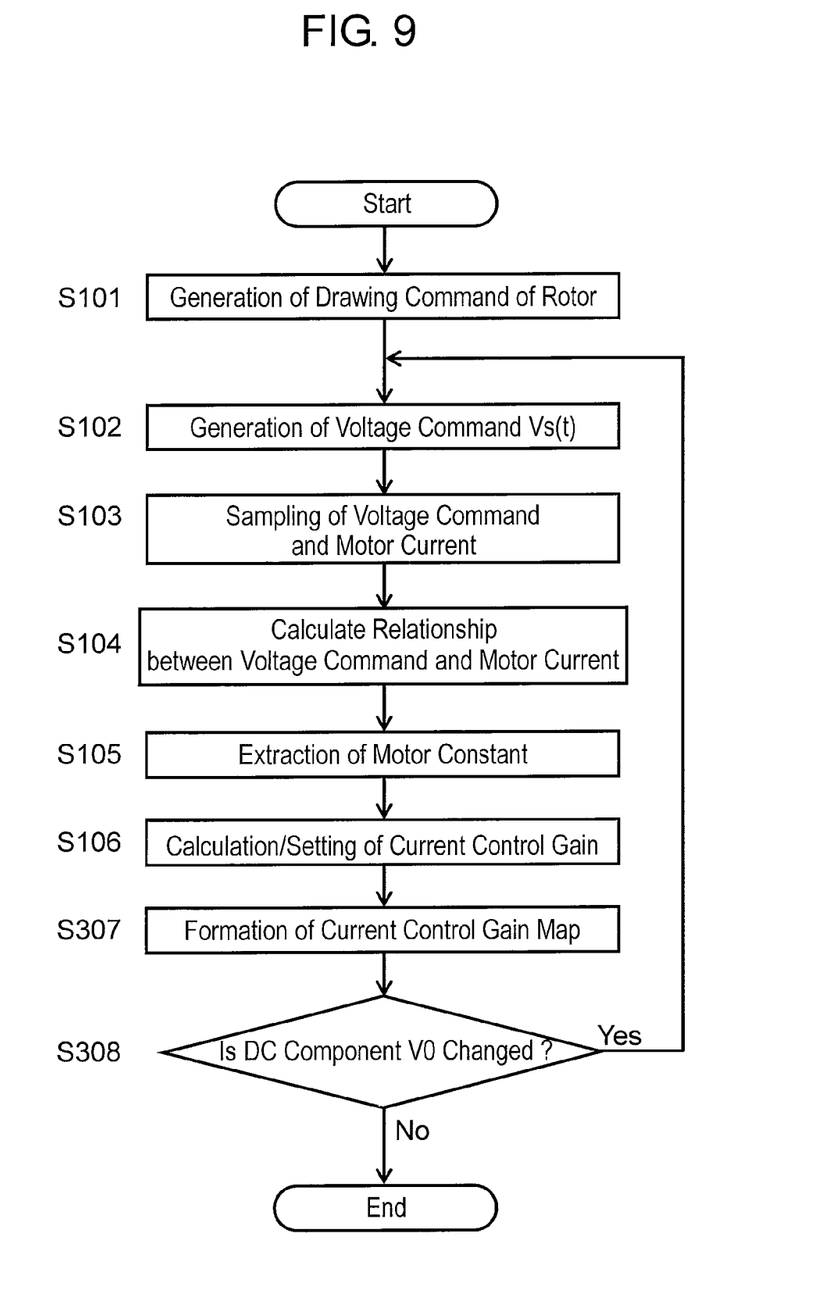
FIG. 9 is a flow chart showing a flow of processes in the third exemplary embodiment of the present invention.

FIG. 9 is a flow chart showing a flow of a process of adjusting a current control gain of a current gain adjusting unit in the third exemplary embodiment of the present invention. Since, in step S101 to step S106 in FIG. 9, the same processes as in the first exemplary embodiment described with reference to FIG. 2 are performed, a description thereof will be omitted.

More specifically, since in FIG. 9, processes in step S307 and step S308 are added to the steps in FIG. 2, details of the added steps will be described. In this case, in step S308, the same process as in step S206 in the second exemplary embodiment described with reference to FIG. 6 is performed.

As shown in FIG. 9, as in the first exemplary embodiment described in FIG. 1, processes from steps S101 to step S105 are executed.

As in the first exemplary embodiment described in FIG. 2, based on electric time constant L/R and phase resistance R serving as a motor constant of the PM motor obtained in step S105, a current control gain is calculated (step S106).

Based on a relationship between a current control gain calculated to a predetermined applied voltage having DC component V0 and an average value of detected motor currents, a current control gain map is formed.

It is determined whether all the applied voltages having a plurality of DC components V0 are set in generation of a voltage command in step S102 (step S308). In this case, the applied voltages having the plurality of DC components V0 are set in the range of zero to a voltage value obtained when the maximum current defined as a specification of PM motor 1 flows in advance.

At this time, when the applied voltages having the plurality of DC components V0 include an unset value (applied voltage) (Yes in step S308), one unset value (applied voltage) of the applied voltages having the plurality of DC components V0 is selected, and the operation returns to step S102. Processes from step 102 to step S307 are sequentially repeatedly executed. In this manner, based on a relationship between an average value of motor currents of the PM motor to each of the applied voltages having the plurality of DC components V0 and a calculated current control gain, a plurality of current control gain maps are formed and stored in a storage medium such as a semiconductor memory.

On the other hand, all the values of the applied voltages having the plurality of DC components V0 are executed (No in step S308) to end the process of adjusting a current control gain of the current gain adjusting unit.

In the motor control device, in a normal speed control state, current gain setting unit 13, based on the current control gain map stored by the above process, sets a current control gain depending on a motor current, and controls the motor current to drive a PM motor.

In this manner, the current control gain is adjusted with a higher current response to make it possible to control the motor current.

As described above, according to the exemplary embodiment, depending on a change in motor current, a current control gain that makes it possible to perform control with an optimum current control gain can be calculated.

The exemplary embodiment describes the example in which the current control gain is changed depending on motor currents. However, the present invention is not limited to the example. For example, a configuration that changes current control gains depending on a motor current command to control a motor current may be used.

Each of the exemplary embodiments describes the method of calculating and setting a current control gain of a PM motor. However, not only the method but also any configuration or any embodying method may be used as long as the configuration and the method have the same functions as those in the above embodiments, as a matter of course. For example, functional blocks except for PM motor 1 in the block diagram in FIG. 1 may be incorporated as one function of a motor control device for a PM motor and functioned by setting. Current gain adjusting unit 11 may be configured as application software for PC (Personal Computer) interlocked with a motor control device for a PM motor. In this manner, the configuration of the motor control device can be simplified.

In each of the exemplary embodiments, an applied voltage in the drawing process (step S101) is set to Va. However, when the rotor of the PM motor is drawn, the applied voltage may be set to an arbitrary different value.

Each of the exemplary embodiments describes the example of performing the drawing process in which the rotor of PM motor 1 is drawn to a predetermined position. However, the present invention is not limited to the example. For example, a single-phase applied voltage may be applied in a direction of an axis about which a motor does not rotate by using position information of position detector 2 without performing the drawing process. In this manner, a processing rate for adjusting a current control gain can be increased.

Each of the exemplary embodiments describes the example in which M-sequence signals are used as signals including a plurality of frequency components added to voltage command Vs(t). The present invention is not limited to the example. For example, when a frequency characteristic can be calculated, another signal, i.e., a signal such as a white-noise signal or a sinusoidal sweep signal the frequency of which changes with time may be used. In this manner, as needed, the frequency characteristic can be calculated by an arbitrary signal.

Each of the exemplary embodiments describes the example in which a frequency characteristic of motor current Is(t) is calculated based on applied voltage command Vs(t). However, the present invention is not limited to the example. When an element, for example, a filter process or a delay element except for the PM motor is present, time-series data the influence of which is compensated for may be added to voltage command Vs(t) to calculate a frequency characteristic. In this manner, the motor constant of the PM motor can be calculated at higher accuracy.

Each of the exemplary embodiments describes the example in which the motor is fixed to a predetermined position after the drawing process to detect a motor current. However, the present invention is not limited to the example. For example, voltage commands Vs(t) may be applied in directions having different electric phases with respect to the position of an axis of magnetic poles after the drawing process to detect motor currents flowing in the same directions. More specifically, 0, Vs(t), and −Vs are applied to a U phase, a V phase, and a W phase, respectively, such that a single-phase applied voltage is applied to an electric axis (q-axis) having an electric phase different by 90° from the position of the axis of magnetic poles after the drawing process, i.e., across the V-W phases, and V-phase motor currents having the same direction may be detected. In this manner, in a PM motor in which motor constants change depending on positions of axes of magnetic poles, for example, an interior permanent magnet (PM) motor or the like, an electric phase in which voltage command Vs(t) is applied can be arbitrarily set. For this reason, motor constants depending on the positions of the axes of magnetic poles can be calculated at high accuracy. In particular, when voltage command Vs(t) is applied to the q-axis to calculate a motor constant, an electric time constant of the q-axis can be calculated.

Each of the exemplary embodiments describes the example in which a current control gain is calculated such that a transfer function of an open loop of a current control system has a predetermined gain margin. However, the present invention is not limited to the example. For example, a current control gain may be calculated such that the transfer function of the open loop of the current control system has a predetermined phase margin, or a gain peak of a transfer function of a closed loop of the current control system becomes a predetermined value.

The present invention includes a voltage applying step of applying an applied voltage including a DC component and a plurality of frequency components to a PM motor, a motor current detecting step of detecting a motor current flowing depending on the applied voltage, and a current control gain adjusting step of calculating a current control gain based on frequency characteristics of the applied voltage and the motor current. In this manner, a stable current control gain having a high current response can be adjusted within a short period of time.

The present invention uses the applied voltage having a plurality of different DC components. In this manner, even though an electric time constant or the like of a PM motor changes depending on a magnitude of a motor current, a stable current control gain having a high current response can be adjusted within the short period of time.

INDUSTRIAL APPLICABILITY

Since a control device for a PM motor according to the present invention can calculate a stable current control gain having a high current response at high accuracy within a short period of time, the present invention is useful for control of a control device for a PM motor having a current control system.

The invention claimed is:

1. A current control gain adjusting method for a PM motor comprising:
a voltage applying step of applying to a PM motor a voltage command including a DC component and a plurality of frequency components;
a motor current detecting step of detecting a responsive motor current flowing through the PM motor in response to application of the voltage command applied in the voltage applying step;
a motor frequency characteristic determining step of calculating a transfer function between the applied voltage command and the detected responsive motor current and determining a frequency characteristic of the transfer function;
a motor constant determining step of determining a motor constant of the PM motor based on the determined frequency characteristic of the transfer function;
a current control gain calculating step of calculating a current control gain using the determined motor constant; and
a current control gain adjusting step of adjusting a setting the calculated current control gain on a current control unit, wherein the current control unit adjusts, with the calculated current control gain, a drive signal for driving the PM motor.

2. The current control gain adjusting method for a PM motor according to claim 1, further comprising repeating the voltage applying step, the motor current detecting step, the motor frequency characteristic determining step, the motor constant determining step and the current control gain calculating step while changing the common DC component to obtain a plurality of current control gains,
wherein the current control gain adjusting step includes setting a selected one of the plurality of current control gains which is selected to optimally serve stable operation of the PM motor.

3. A control device for a PM motor, comprising a current gain adjusting unit that implements the current control gain adjusting method according to claim 2.

4. A control device for a PM motor, comprising a current gain adjusting unit that implements the current control gain adjusting method according to claim 1.

5. A current control method for a PM motor comprising:
a voltage applying step of applying to a PM motor a voltage command including a DC component and a plurality of frequency components;
a motor current detecting step of detecting a responsive motor current flowing through the PM motor in response to application of the voltage command applied in the voltage applying step;
a motor frequency characteristic determining step of calculating a transfer function between the applied voltage command and the detected responsive motor current and determining a frequency characteristic of the transfer function;
a motor constant determining step of determining a motor constant based on the determined frequency characteristic;
a current control gain calculating step of calculating a current control gain using the determined motor constant;
a current control gain map forming step of storing the calculated current gain in a map in association with a motor operating current;
a repeating step of repeating the voltage applying step, the motor current detecting step, the motor frequency characteristic determining step, the motor constant determining step, the current control gain calculating step and current control gain map forming step while changing a value of the DC component to obtain a plurality of current control gains in the map stored in association with a plurality of motor operating currents; and
a current control gain adjusting step of setting a selected one of the current control gains in the map on a current control unit, wherein the selected one of the current control gains is selected from the map according to a detected motor operating current and further wherein the current control unit adjusts, with the selected one of the current control gains, a drive signal for driving the PM motor.

6. A control device for a PM motor, comprising a current gain adjusting unit that implements the current control method according to claim 5.

* * * * *